(12) United States Patent
Zhao (10) Patent No.: US 8,270,990 B2
(45) Date of Patent: Sep. 18, 2012

(54) TECHNIQUES TO PROVIDE ENHANCED MESSAGE MANAGEMENT SERVICES

(75) Inventor: Wen Zhao, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 378 days.

(21) Appl. No.: 12/642,196

(22) Filed: Dec. 18, 2009

(65) Prior Publication Data

US 2011/0151884 A1 Jun. 23, 2011

(51) Int. Cl.
 *H04W 72/00* (2009.01)
(52) U.S. Cl. .................. 455/452.1; 455/452.2; 455/453; 455/455; 455/574; 370/329; 370/311; 370/332
(58) Field of Classification Search .................. 455/522, 455/572, 573, 574, 456.4, 452.1, 452.2; 370/311, 370/345, 330, 329, 338, 458
See application file for complete search history.

(56) References Cited

U.S. PATENT DOCUMENTS

| 2004/0002367 A1* | 1/2004 | Chanut .......................... 455/574 |
| 2004/0102228 A1* | 5/2004 | Hakamata et al. ............. 455/572 |
| 2005/0124350 A1* | 6/2005 | Wu .............................. 455/452.2 |
| 2008/0285496 A1* | 11/2008 | Fuchs et al. ................... 370/311 |
| 2009/0312072 A1* | 12/2009 | Hong et al. .................... 455/573 |
| 2010/0130260 A1* | 5/2010 | Naruse .......................... 455/566 |

* cited by examiner

*Primary Examiner* — Kathy Wang-Hurst (57) ABSTRACT

Techniques to provide enhanced message management services are described. An apparatus may comprise a mobile computing device having a radio module operative to establish a wireless communication channel with a wireless resource, and a message manager communicatively coupled to the radio module. The message manager may be operative to receive a message size parameter for a message, determine a first time parameter representing a length of time needed to communicate the message based on an available bandwidth parameter, determine a second time parameter representing a length of time available to communicate the message based on an available power parameter, and send a transmit control directive to the radio module indicating whether to communicate the message over the wireless communication channel based on the first and second time parameters. Other embodiments are described and claimed.

17 Claims, 5 Drawing Sheets

TECHNIQUES TO PROVIDE ENHANCED MESSAGE MANAGEMENT SERVICES

BACKGROUND

Mobile computing devices, such as smart phones, have become highly capable communication devices in recent years. In addition to the wide array of processing capabilities such as digital assistant (PDA) features, including word processing, spreadsheets, synchronization of information (e.g., email) with a desktop computer, and so forth, mobile computing devices also typically include wireless communications capabilities to provide features, such as mobile telephony, mobile email access, web browsing, and content (e.g., video and radio) reception. Exemplary wireless communications technologies include cellular, satellite, and mobile data networking technologies.

Providing such a wide array of functionality in a single device results in increased power requirements. As the amount of power required to provide the ever increasing array of capabilities continues to increase, conservation of power becomes an important consideration. As a result, it is desirable to adapt the power consumption of a mobile computing device, when possible, to conserve power. It is with respect to these and other reasons that techniques to improve management of operating parameters for a mobile computing device are needed.

DETAILED DESCRIPTION

Various embodiments are generally directed to techniques to provide enhanced message management services for a mobile computing device, such as a smart phone, for example. Some embodiments are particularly directed to techniques to provide enhanced message management services to control message communication based on communication parameters and transmission quality. This may enhance behavior and performance for various hardware and/or software components of the mobile computing device, such as power conservation, for example.

As a mobile computing device changes locations so does its corresponding operating environment. This may significantly affect wireless communications for radios implemented by a mobile computing device. For example, a mobile computing device may experience lower transmission quality, or even lose connection, as it moves away from a wireless resource, such as a fixed wireless access point or cellular base station. In some cases, obstacles may move within a given operating environment for a stationary mobile computing device, thereby also affecting wireless transmission characteristics. When a mobile computing device experiences lower transmission quality as a result of changes in an operating environment, an amount of bandwidth available to communicate information from the mobile computing device suffers as well. At the same time, many applications, services and features implemented by a mobile computing device are increasingly designed for larger bandwidth channels. For instance, a mobile computing device may send messages with larger audio, video or image files as attachments. As a result, when a mobile computing device attempts to send a message with larger attachments through an operating environment providing lower transmission rates, there may be significant impact on device performance. For example, a radio module or wireless transceiver may consume more power thereby shortening battery life. In another example, a radio module or wireless transceiver may consume more processing cycles or memory resources thereby affecting other applications or services provided by a mobile computing device.

To solve these and other problems, a mobile computing device may implement one or more enhanced message management services to manage communication of messages based on transmission characteristics of an operating environment. In one embodiment, for example, a mobile computing device may include, among other elements, a radio module operative to establish a wireless communication channel with a wireless resource, such as a fixed wireless access point or cellular base station or Node B. The mobile computing device may further include a message manager communicatively coupled to the radio module. The message manager may be arranged to receive a message size parameter for a message. The message and/or message size parameter may be generated from a messaging application, such as an email application, for example. The message manager may determine a first time parameter representing a length of time needed to communicate the message based on an available bandwidth parameter. The available bandwidth parameter may be received from a radio manager, or derived from information received from the radio manager. The message manager may determine a second time parameter representing a length of time available to communicate the message based on an available power parameter. The power parameter may be received from a power manager, or derived from information received from the power manager. The message manager may then generate and send a transmit control directive to the radio module indicating whether to communicate the message over the wireless communication channel based on the first and second time parameters.

The message manager may automatically generate a transmit control directive using a set of rules in a rules database, or generate a transmit control directive by soliciting user commands via a user interface and input device for the mobile computing device. Additionally or alternatively, the message manager may attempt to modify one or more communication parameters in an attempt to reduce power consumption at a cost of reduced transmission quality, or vice-versa.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements, nodes or modules in a certain topology by way of example, the embodiment may include other combinations of elements, nodes or modules in alternate arrangements as desired for a given implementation. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment. It should also be understood that the use of the term control to refer to data and/or signals throughout the application can refer to data flowing in any direction as control and/or status data or signals.

Figure 1:
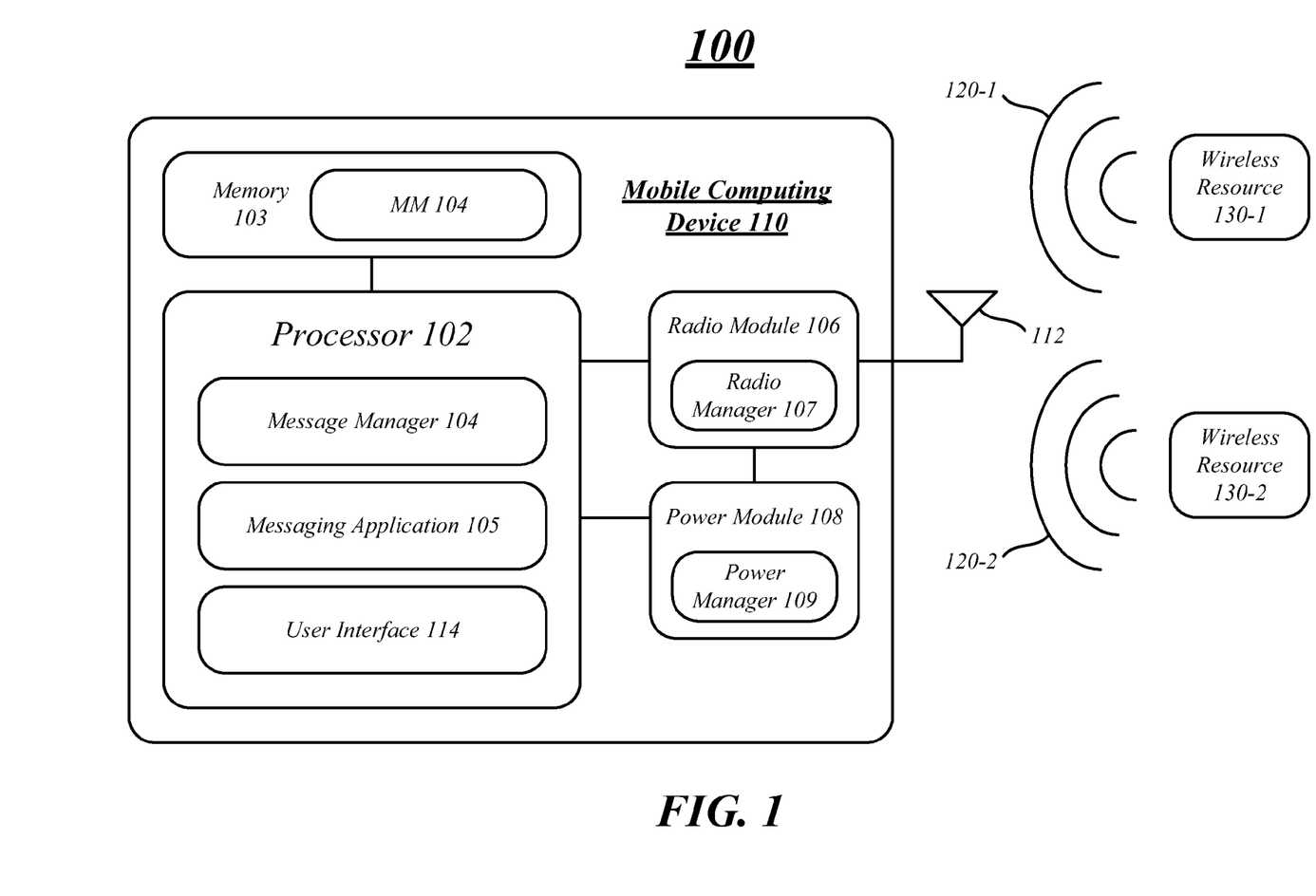
FIG. 1 illustrates one embodiment of a first mobile computing device.

FIG. 1 illustrates one embodiment of an apparatus that may communicate across different types of wireless links. In particular, FIG. 1 shows a communications system 100 comprising various representative elements, including a mobile computing device 110 capable of communicating via radio signals 120-1-$m$ with one or more wireless resources 130-1-$n$. The mobile computing device 110 may include by way of example and not limitation a processor 102, a memory 103, a message manager 104, a messaging application 105, a radio module 106, a power module 108, an antenna 112, and a user interface 114. The radio module 106 may further include a radio manager 107. The power module 108 may further include a power manager 109. These elements or portions of these elements may be implemented in hardware, software, firmware, or in any combination thereof. The embodiments are not limited to these depicted elements.

In some embodiments, one or more interfaces may employ various techniques to exchange information between the elements of the mobile computing device 110. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In various embodiments, the mobile computing device 110 may be generally configured to support or provide cellular voice communication, wireless data communication and computing capabilities. The mobile computing device 110 may be implemented as a combination handheld computer and mobile telephone, sometimes referred to as a smart phone. Examples of smart phones include, for example, Palm® products such as the Palm Pre™, Palm Pixi™ and Palm Treo™ line of smart phones. Although some embodiments may be described with the mobile computing device 110 implemented as a smart phone by way of example, it may be appreciated that the embodiments are not limited in this context. For example, the mobile computing device 110 may comprise, or be implemented as, any type of wireless device, mobile station, or portable computing device with a self-contained power source (e.g., battery) such as a laptop computer, ultra-laptop computer, personal digital assistant (PDA), cellular telephone, combination cellular telephone/PDA, mobile unit, subscriber station, user terminal, portable computer, handheld computer, palmtop computer, wearable computer, media player, pager, messaging device, data communication device, and so forth. Additional details for a mobile computing device may be described in more detail with reference to FIG. 5.

The processor 102 may comprise a general purpose processor, a communications processor or an application specific processor arranged to provide general or specific computing capabilities for the communications system 100. For example, the processor 102 may perform operations associated with higher layer protocols and applications. For instance, the processor 102 may be implemented as a host processor to provide various user applications, such as telephony, text messaging, email, web browsing, word processing, video signal display, and so forth. In addition, the processor 102 may provide one or more functional utilities that are available to various protocols, operations, and/or applications. Examples of such utilities include operating systems, device drivers, user interface functionality, and so forth.

The memory 103 may comprise computer-readable media such as volatile or non-volatile memory units arranged to store programs and data for execution by the processor 102. As depicted in FIG. 1, the memory 103 may store a message manager 104 in the form of executable program instructions, code or data. Additionally or alternatively, the memory 103 may also store a messaging application 105, and/or a user interface 114 in the form of executable program instructions, code or data. The processor 102 may retrieve and execute the program instructions, code or data from the memory 103 to adaptively control one or more operational parameters for the mobile computing device 110, such as operation and/or communication parameters of the radio module 106. Although the message manager 104, the messaging application 105 and the user interface 114 are described as part of the memory 103 for execution by the processor 102, it may be appreciated that the message manager 104, the messaging application 105 and/or the user interface 114 may be stored and executed by other memory and processing resources available to the mobile computing device 110, such as a radio or communications processor and accompanying memory implemented by the radio module 106. Further, although the message manager 104, the messaging application 105 and the user interface 114 are depicted as software executed by a processor, it may be appreciated that some or all of these elements may be implemented in hardware as well using one or more integrated circuits, for example. The embodiments are not limited in this context.

The radio module 106 may comprise one or more radios or wireless transceivers, each having various radio elements, including a radio processor, one or more transceivers, amplifiers, filters, switches, and so forth. The radio module 106 may communicate with remote devices across different types of wireless links utilizing various wireless wide area network (WWAN) communications techniques. For example, the radio module 106 may communicate across wireless links provided by one or more cellular radiotelephone systems. Examples of cellular radiotelephone systems may include Code Division Multiple Access (CDMA) systems, GSM systems, North American Digital Cellular (NADC) systems, Time Division Multiple Access (TDMA) systems, Extended-TDMA (E-TDMA) systems, Narrowband Advanced Mobile Phone Service (NAMPS) systems, third generation (3G) systems such as Wide-band CDMA (WCDMA), CDMA-2000, Universal Mobile Telephone System (UMTS) systems, and so forth. The radio module 106 (or additional radio modules) may also communicate across data networking links provided by one or more cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Evolution For Data and Voice (EV-DV) systems, High Speed Downlink Packet Access (HSDPA) systems, High Speed Uplink Packet Access (HSUPA), and so forth. The embodiments, however, are not limited to these examples.

In some cases, the radio module 106 may additionally or alternatively communicate across various non-cellular communications links, such as a wireless local area network (WLAN). The radio module 106 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

The mobile computing device 110 may also utilize different types of shorter range wireless systems, or wireless personal area networks (WPAN) such as a Bluetooth system operating in accordance with the Bluetooth Special Interest Group (SIG) series of protocols, including Bluetooth Specification versions v1.0, v1.1, v1.2, v1.0, v2.0, v2.1, v3.0 with Enhanced Data Rate (EDR) (as well as one or more Bluetooth Profiles) and any revisions, progeny and variants, and so forth. Other examples may include systems using infrared techniques or near-field communication techniques and protocols, such as electro-magnetic induction (EMI) techniques. An example of EMI techniques may include passive or active radio-frequency identification (RFID) protocols and devices.

It may be appreciated that the radio module 106 may utilize different communications elements (e.g., radio processors, transceivers, etc.) to implement different communications techniques. Furthermore, the radio module 106 may support multiple communications techniques by implementing multiple sets of corresponding radio equipment. For example, the radio module 106 may support GSM communications using a first transceiver, IEEE 802.xx (e.g., 802.11) communications using a second transceiver, Bluetooth communications using a third transceiver, and so forth. The embodiments are not limited in this context.

The radio module 106 may have a radio manager 107 arranged to control some or all of the operations for the radio module 106. For instance, the radio manager 107 may cause one or more radios implemented by the radio module 106 to periodically or continuously scan wireless shared media, such as one or more portions of the radio-frequency (RF) spectrum. The radio module 106 may implement a scanning algorithm to perform various scanning operations for radio energy. Radio energy may refer to RF energy used by a radio or wireless transceiver for communicating information, rather than spurious energy received from various electronic devices, such as a microwave, monitor, television, and so forth. For example, the radio module 106 and/or the radio manager 107 may measure a received radio signal strength, received signal strength (RSS) or received signal strength indication (RSSI) from nearby wireless resources (collectively referred to herein as "RSSI"). An RSSI is typically a measurement of the power present in a received radio signal in arbitrary units. The RSSI may provide an indication of how much information may be communicated between devices. Typically a lower RSSI implies lower information rates or quality, while a higher RSSI implies higher information rates or quality.

The scanning operations may include scanning for radio energy of a given RSSI in the appropriate bands or sub-bands of the RF spectrum allocated to the one or more transceivers or radios implemented by the radio module 106. For example, the radio module 106 may scan for various radio signals 120-1-$m$ received from various wireless resources 130-1-$n$. The wireless resources 130-1-$n$ may utilize a radio module implementing the same or similar communication techniques as implemented for the radio module 106. The radio module 106 may perform the scanning operations using a scan list to scan various sets of frequencies. The radio module 106 may perform scanning operations for any number of reasons, such as establishing, managing or terminating a voice communication session or a data communication session, performing hand-off operations when the mobile computing device 110 is moving between wireless resources (e.g., 130-1, 130-2), switching communication channels for the same wireless resource (e.g., 130-1) due to bandwidth or quality issues, and so forth.

The radio manager 107 may use the information collected during scanning operations to measure or estimate available bandwidth for the wireless communication channel based on one or more communication parameters. In general, digital bandwidth, network bandwidth or just bandwidth is a measure of available or consumed data communication resources expressed in bits per second (bit/s) or multiples of it (e.g., kbit/s, Mbit/s etc). Bandwidth may refer to bandwidth capacity or available bandwidth in bit/s, which typically means the net bit rate, channel capacity or the maximum throughput of a logical or physical communication path in a digital communication system. The radio manager 107 may collect or measure various characteristics of an RF channel to estimate an available bandwidth for the RF channel. This measurement may also include previous samples, such as previously consumed bandwidth corresponding to an average data rate of successful data transfer through a communication path, sometimes referred to as "throughput" or "goodput." The radio manager 107 may use prospective or historical information about the RF channel to generate an available bandwidth parameter for one or more radios of the radio module 106.

It is worthy to note that although the radio manager 107 is shown implemented as part of the radio module 106 in the depicted embodiment, it may be appreciated that the radio manager 107 may be implemented in other parts of the mobile computing device 110, such as the processor 102 and memory 103, for example. The embodiments are not limited in this context.

The power module 108 may be arranged to provide power for the mobile computing device 110. In one embodiment, the power module 108 may comprise a power supply (or power supply unit) and the power manager 109. The power supply may be arranged to provide electrical power to the various elements of the mobile computing device 110, and include a power distribution system as well as primary and/or secondary sources of energy. The primary source may include AC line voltage converted to a well-regulated lower-voltage DC for electronic devices (e.g., using a transformer or power converter). The secondary source may include a portable power source, such as a battery, that provides lower-voltage DC as well. The battery may comprise rechargeable and/or non-rechargeable types of batteries.

The power manager 109 may manage various operations for the power supply and/or the mobile computing device 110, such as increasing or decreasing an amount of power provided to a given set of elements for the mobile computing device 110, or placing a given set of elements in various power consumption modes. The power manager 109 may also be arranged to measure an amount of remaining power capacity available from the power supply, and generate an available power parameter. The available power parameter may represent, for example, a discharge rate having a unit of amperes (A), milliampere (mA), ampere-hour (Ah), milliampere-hour (mAh), or milliampere second (mAs), or some other measurable power unit. In one embodiment, the available power parameter may vary as a function of radio signal conditions of a given RF operating environment. For example, better RF conditions typically consume less transmit power, and therefore a radio from the radio module 106 may transmit at a lower power level. As a result, x mA of a battery is able to last longer. By way of contrast, under worse RF conditions, the same x mA of battery may last for a shorter period of time since the radio has to transmit at higher power level. In one embodiment, for example, the power manager 109 may exchange information with the radio manager 107 to factor in radio signal conditions when determining an available power parameter for the power supply of the power module 108.

The wireless resources 130-1-n may comprise any wireless device, fixed or mobile, utilizing a radio module implementing the same or similar communication techniques as implemented for the radio module 106. Examples of wireless resources 130-1-n may include without limitation a wireless access point for a WLAN such as an 802.11 or 802.16 system, a base station or node B for a WWAN such as a cellular radiotelephone system, a wireless gateway for an enterprise network, a peer device such as another mobile computing device 110, and so forth.

In general operation, the radio module 106 may receive radio signals from one or more wireless resources 130-1-n, such as a wireless access point or base station. In one embodiment, for example, the radio manager 107 may be operative to collect one or more samples for the one or more wireless resources 130-1-n based on the received radio signals. The sample may be some measurable characteristic of the one or more wireless resources, such as a RSSI value and/or SNR value derived from the received radio signals of the one or more wireless resources, a number of wireless resources 130-1-n derived from the received radio signals, a communication protocol used by one or more wireless resources 130-1-n, an application program used by one or more wireless resources 130-1-n, a parameter or control directive received from one or more wireless resources 130-1-n, and so forth. Other measurable characteristics for the wireless resources 130-1-n may be collected as well. The embodiments are not limited in this context.

The message manager 104 may implement one or more enhanced message management techniques to manage communication of messages from the message application 105 by the radio module 106 based on transmission characteristics of a given operating environment for the mobile computing device 110. For instance, the message manager 104 may receive various inputs from other elements of the mobile computing device 110, such as message size, available bandwidth and available power. The message manager 104 may use this information to determine whether a message and/or message attachment is too large or will consume too much power relative to available bandwidth of a wireless communication channel established by the radio module 106. The message manager 104 may automatically generate a transmit control directive using a set of rules in a rules database, or generate a transmit control directive by soliciting user commands via a user interface and input device for the mobile computing device. The message manager 104 may send the transmit control directive to the radio module 106 to control transmission of the message and/or message attachment.

Additionally or alternatively, the message manager 104 may attempt to modify one or more communication parameters of the radio module 106 in an attempt to reduce power consumption at a cost of reduced transmission quality, or vice-versa. Examples of communication parameters may include without limitation a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for a radio implemented by the mobile computing device 110. The embodiments are not limited in this context.

Additionally or alternatively, the message manager 104 may attempt to modify one or more operational parameters of the mobile computing device 110 in an attempt to reduce power consumption at a cost of reduced transmission quality, or vice-versa. For instance, the message manager 104 may instruct the message application 105 to reduce attachment file size, thereby reducing the overall message size for a message. In another example, the message manager 104 may instruct a digital camera to reduce image quality for captured images or streaming audio/visual (AV) information.

The messaging application 105 may comprise any one of several messaging applications arranged to communicate various types of messages in a variety of formats. Examples for the messaging application 105 may comprise without limitation a telephone application such as a cellular telephone application, a Voice over Internet Protocol (VoIP) application, a Push-to-Talk (PTT) application, and so forth. Examples for the messaging application 105 may further comprise a voicemail application, a facsimile application, a video teleconferencing application, an instant messaging (IM) application, an email application, a short messaging service (SMS) application, a multimedia messaging service (MMS) application, and so forth. The messaging applications may be representative of a particular kind of transport, enabling handling of messages of particular types and formats for the particular application. It is to be understood that the embodiments are not limited in this regard and that the messaging application 105 may include any other type of messaging or communications application which is consistent with the described embodiments. It also is to be appreciated that the mobile computing device 110 may implement other types of applications in addition to messaging application 105 which are consistent with the described embodiments.

In addition to generating a message, such as an email message, the messaging application 105 may also provide for attaching additional information to a message. The additional information is typically referred to as an "attachment." An attachment may include any discrete set of information, such as an audio file, a video file, an AV file, an image, a document, another message, an application, and any other digital files. In general operation, a user may use the messaging application 105 to generate a message and attach a digital file to the message, thereby forming a complete message unit having a measurable message size. As used herein, the term "message size" may refer to both a message and any attachments for the message, although in some cases may refer only to a message or attachments. The embodiments are not limited in this context.

The user interface 114 may comprise any user interface or graphic user interface (GUI) suitable for use with the mobile computing device 110. The user interface 114 may comprise a stand-alone application or part of another application, such as an operating system. The user interface 114 may be arranged to receive information from the message manager 104 and/or the messaging application 105, and generate a user interface message for display on a digital display of the mobile computing device 110. The user interface message may have the received information in the form of a text string, such as "This message will take 15 minutes to transmit" or "This message will consume 15 out of 20 minutes of available power." The user interface message may also contain various user interface elements, such as radio buttons or menu choices, to receive user commands via a suitable input device (e.g., a touch screen, thumb board, keypad, trackball, scroll wheel, and so forth).

As the mobile computing device 110 changes locations so does its corresponding operating environment. This may significantly affect wireless communications for one or more radios implemented by the radio module 106 of the mobile computing device 110. For example, a radio may experience lower transmission quality, or even lose connection, as it moves away from a wireless resource 130-1-$n$, such as a fixed wireless access point or cellular base station. In some cases, the mobile computing device 110 may remain stationary, and obstacles may move within a given operating environment for the stationary mobile computing device, thereby also affecting wireless transmission characteristics. This phenomenon may be further described with reference to FIG. 2.

Figure 2:
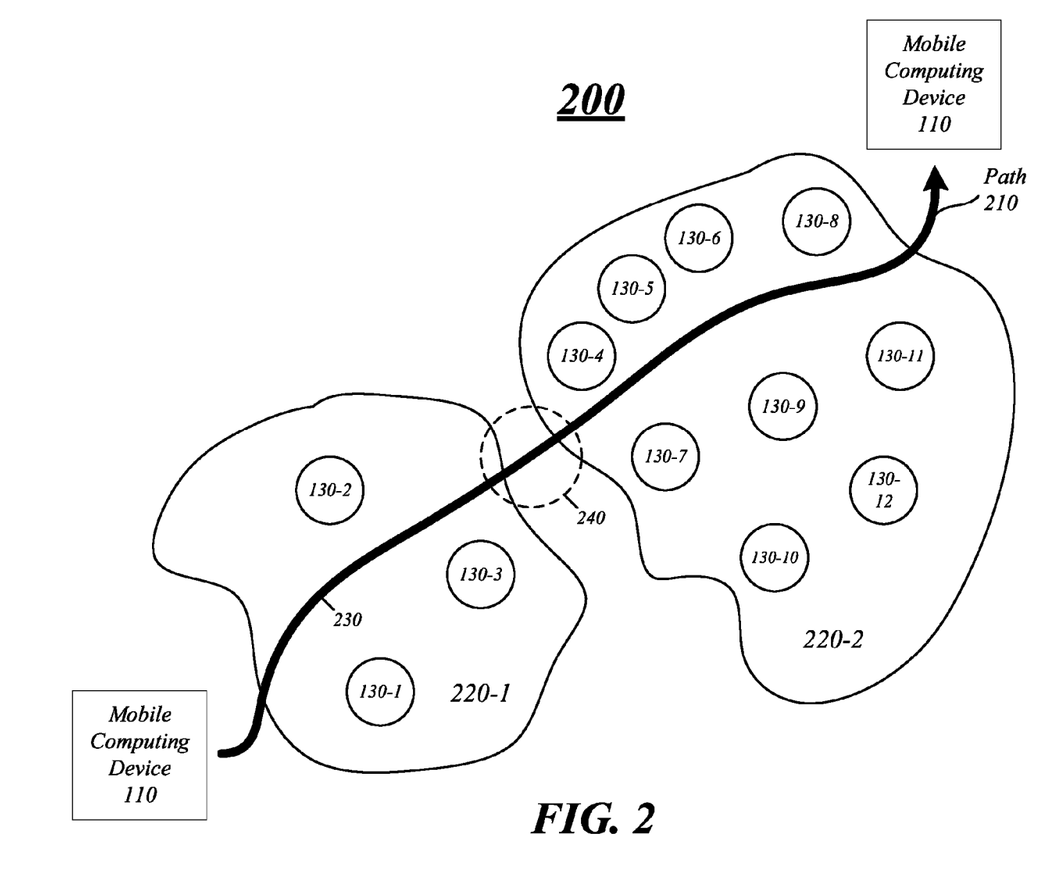
FIG. 2 illustrates one embodiment of an operating environment.

FIG. 2 illustrates one embodiment of an operating environment 200. The operating environment 200 may comprise an exemplary operating environment for the mobile computing device 110, such as a wireless system composed of one or more WLANs or WWANs, suitable for use with some embodiments. The operating environment 200 may comprise multiple geographic regions 220-1-$r$ each providing wireless services for a geographic area, such as a cellular site, a building or a campus. Each geographic region 220-1-$r$ may be serviced by one or more wireless resources 130-1-$n$. In one embodiment, for example, the wireless resources 130-1-$n$ may each comprise wireless access points. Assume the mobile computing device 110 traverses various geographic regions 220-1-$r$ of the operating environment 200 as it travels along path 210. As shown in FIG. 2, the mobile computing device 110 may traverse portions of geographic regions 220-1, 220-2 along path 210, and connect to difference wireless access points to create or maintain one or more connections or communication channels with the different WLANs or WWANs.

Assume the location granularity is selected as one of the geographical regions 220-1, 220-2 in the operating environment 200. The radio manager 107 may collect resource information for all wireless resources 130-1-$n$ within, or accessible from, a given geographic region. This may include wireless resources for a current geographic region or a neighbor geographic region accessible from a location of the mobile computing device 110. For example, as the mobile computing device 110 enters communication range for geographic region 220-1 as indicated by position 230, the radio manager 107 may begin detecting communications signals from one or more of the wireless resources 130-1, 130-2 and 130-3. Similarly, as the mobile computing device 110 enters communication range for geographic region 220-2 as indicated by position 240, the radio manager 107 may begin detecting communications signals from one or more of the wireless resources 130-4 to 130-12.

As the mobile computing device 110 traverses a particular geographic region along path 210, the radio detector 107 may perform periodic, aperiodic, on-demand or continuous measurements of the wireless RF environment to collect information about each wireless resource 130-1-$n$ within each geographic region 220-1-$r$. For example, the radio manager 107 may collect one or more samples for the one or more wireless resources 130-1-$n$ based on the received radio signals. The samples may be some measurable characteristic of the one or more wireless resources, such as a RSSI value, a number or count of wireless resources 130-1-$n$, a communication protocol used by one or more wireless resources 130-1-$n$, an application program used by one or more wireless resources 130-1-$n$, a parameter or control directive received from one or more wireless resources 130-1-$n$, and so forth. The radio manager 107 and/or the message manager 104 may use the samples to estimate available bandwidth for a wireless communication channel within a given geographic region 220-1-$r$ where the mobile computing device 110 is currently located.

As shown in FIG. 2, the operating environment 200 has two geographic regions 220-1, 220-2. Each of the geographic regions 220-1, 220-2 contains a certain number of wireless resources 130-1-$n$. For instance, the geographic region 220-1 contains the wireless resources 130-1, 130-2 and 130-3, while the geographic region 220-2 contains the wireless resources 130-4, 130-5, 130-6, 130-7, 130-8, 130-9, 130-10, 130-11 and 130-12. As can be readily discerned, the geographic region 220-1 has a lower number of wireless resources 130-1-$n$ than the geographic region 220-2 (e.g., 3 versus 9), and therefore the geographic region 220-1 has a lower network density relative to the geographic region 220-2, which has a higher network density. As such, the transmission quality when the mobile computing device 110 is within the geographic region 220-1 may vary considerably from the transmission quality when the mobile computing device 110 is operating within the geographic region 220-2.

This may be particularly exacerbated when the mobile computing device 110 is located between the geographic regions 2201, 220-2 as indicated by position 240. At position 240 the radios of the radio module 106 may have little or no signal reception from any of the wireless resources 130-1-$n$ since the mobile computing device 110 is outside transmission envelopes of any nearby wireless resources 130-1-$n$, such as the wireless resources 130-3, 130-4 and 130-7. If the messaging application 105 generates a message with a particularly large attachment, and there is insufficient bandwidth and/or power to transmit the message and attachment, the power supply for the power module 108 may be significantly reduced or drained in repeated attempts to transmit the message to a wireless resource 130-1-$n$.

In various embodiments, the message manager 104 may implement one or more enhanced message management techniques to manage communication of messages from the message application 105 by the radio module 106 based on transmission characteristics of a given operating environment 200 (e.g., geographic regions 220-1-$r$) for the mobile computing device 110. In one embodiment, for example, the radio module 106 may establish a wireless communication channel with a wireless resource 130-1-$n$. The wireless resource 130-1-$n$ may comprise, for example, a fixed wireless access point for a WLAN or cellular base station or Node B for a cellular radiotelephone system of a WMAN or WWAN.

The message manager 104 may receive a message size parameter for a message from the messaging application 105. The message manager 104 may determine a first time parameter representing a length of time needed to communicate the message based on an available bandwidth parameter. In one embodiment, for example, the available bandwidth parameter may be calculated and sent from the radio manager 107 to the message manager 104 over a suitable interface. In one embodiment, for example, the message manager 104 may receive raw information about the RF channel, and may calculate an available bandwidth parameter itself using the information received from the radio manager 107. The latter case may be particularly desirable when installing the message manager 104 on a mobile computing device having a legacy radio module. In either case, the message manager 104 may use an available bandwidth parameter and determine a first time parameter.

By way of example, assume the radio module 106 includes a cellular radiotelephone system radio compliant with an Evolution-Data Optimized or Evolution-Day Only (EVDO) 3$^{rd}$ Generation Partnership Project 2 (3GPP2) telecommunications standard, and capable of interface speeds of approximately 2.4 Mbit/s on a forward link (e.g., base station to mobile) and 1.8 Mbit/s on a reverse link (mobile to base station). Further assume that the mobile computing device 110 is in at a location where the EVDO compliant radio may achieve an approximate bandwidth of 1 Mbit/s. In this case, a message size of 1 megabyte (MB) will take approximately 8 seconds to transmit, 10 MB will take approximately 2 minutes to transmit, and 100 MB will take approximately 13 minutes to transmit.

The message manager 104 may determine a second time parameter representing a length of time available to communicate the message based on an available power parameter. The available power parameter may be received from the power manager 109, or derived by the message manager 104 from information received from the power manager 109. The message manager 104 may use the message size received from the messaging application 105 and the available power parameter received from the power manager 109 to calculate a second time parameter using standard discharge rate algorithms for a battery.

The message manager 104 may generate and send a transmit control directive to the radio module 106 indicating whether to communicate a message over a wireless communication channel based on first and second time parameters. The message manager 104 may automatically generate a transmit control directive using a set of rules in a rules database, or generate a transmit control directive by soliciting user commands via a user interface and input device for the mobile computing device 110.

In one embodiment, for example, the message manager 104 may compare the first and second time parameters to obtain a time difference, and automatically send the transmit control directive to the radio module 106 indicating to delay communicating the message over the wireless communication channel when the time difference is less than a threshold value. For example, assume the first time parameter for a message size of 100 MB at an available bandwidth of 1 Mbit/s is 13 minutes, and if the second time parameter for the power module 108 is 15 minutes, then the time difference of 2 minutes may be compared to a threshold parameter. If the threshold parameter is set for 10 minutes, for example, then the message manager 104 may generate and send a transmit control directive to the radio module 106 with control information instructing the EVDO compliant radio to delay communicating the message over the wireless communication channel. The delay interval may be a time based delay (e.g., wait 10 minutes), a location based delay (e.g., wait for change in location of the mobile computing device 110), a bandwidth based delay (e.g., wait until available bandwidth is 1.8 Mbit/s), a permanent delay (e.g., wait for explicit instructions to send), and any other desired delay interval.

In one embodiment, the message manager 104 may compare first and second time parameters to obtain a time difference, and automatically send a transmit control directive to the radio module indicating to communicate the message over the wireless communication channel when the time difference is greater than a threshold value. For example, assume the first time parameter for a message size of 10 MB at an available bandwidth of 1 Mbit/s is 2 minutes, and if the second time parameter for the power module 108 is 15 minutes, then the time difference of 13 minutes may be compared to a threshold parameter. If the threshold parameter is set for 10 minutes, for example, then the message manager 104 may generate and send a transmit control directive to the radio module 106 with control information instructing the EVDO compliant radio to immediately begin communicate the message over the wireless communication channel.

As an addition, or alternative, to the message manager 104 automatically generating a transmit control directive using a set of rules in a rules database, the message manager 104 may generate a transmit control directive by soliciting user commands via the user interface 114 and an input device for the mobile computing device 110. In one embodiment, for example, the message manager 104 may compare first and second time parameters to obtain a time difference, and generate a user interface message or information for a user interface message indicating the time difference. The message manager 104 may send the user interface message or information for a user interface message to the user interface 114 for subsequent display on a digital display of the mobile computing device 110. The user interface 114 may receive a user command signal in response to the user interface message, such as selection of a GUI button on a touch screen display, and forward to the message manager 104. The message manager 104 may generate and send a transmit control directive to the radio module 106 indicating whether to communicate the message over the wireless communication channel based on the user command signal. In this manner, a user of the mobile computing device 110 may control a tradeoff between priority in sending a message and battery life.

As an addition, or alternative, to a discrete transmit or no transmit state, the message manager 104 may have logic that attempts to modify various communication parameters in an attempt to reduce power consumption at a cost of reduced transmission quality, or vice-versa. In one embodiment, for example, the message manager 104 may compare first and second time parameters to obtain a time difference, and attempt to modify a communication parameter for the radio module 106 to increase the time difference.

A radio for the radio module 106 may have various communication parameters set that affect operation of the radio. Examples of communication parameters may include without limitation a network scanning threshold parameter, a radio-frequency channel parameter, an access point parameter, a rate selection parameter, a frame size parameter, an aggregation size parameter, a packet retry limit parameter, a protocol parameter, a radio parameter, modulation and coding scheme (MCS), acknowledgement parameter, media access control (MAC) layer parameter, physical (PHY) layer parameter, and any other communication parameters affecting operations for a radio implemented by the radio module 106 of the mobile computing device 110. Typically the communication parameters are set based on a protocol or application. For instance, the modulation used to communicate with a given mobile is typically determined by the mobile itself. It listens to the traffic on the channel, and depending on the receive signal strength along with the perceived multipath and fading conditions, makes its best guess as to what data-rate it can sustain while maintaining a reasonable frame error rate of 1-2%. It then communicates this information back to the serving sector in the form of an integer between 1 and 12 on a Digital Rate Control (DRC) channel. Implementing a different modulation technique may affect data rates. For example, DRC values for an EVDO compliant radio may include a DRC Index of 1, which has a data rate of 38.4 kbit/s using Quadrature Phase-Shift Keying (QPSK) modulation at a signal-to-noise ratio (SNR) of −12 decibels (dB). A DRC Index of 10, however, has a data rate of 1228.8 kbit/s using 16 Quadrature Amplitude Modulation (16-QAM) at an SNR of 3.8 dB. Consequently, changing modulation techniques may change data rates at the expense of other factors (e.g., frame error rate).

The message manager 104 may attempt to modify various communication parameters for a radio of the radio module 106 in an attempt to reduce power consumption at a cost of reduced transmission quality, or vice-versa. The message manager 104 may then send a transmit control directive to the radio module 106 indicating to communicate the message over a wireless communication channel using a modified communication parameter.

As an addition, or alternative, to the message manager 104 automatically generating a transmit control directive using a modified communication parameter, the message manager 104 may generate a transmit control directive by soliciting user commands via the user interface 114 and an input device for the mobile computing device 110. In one embodiment, for example, the message manager 104 may compare first and second time parameters to obtain a time difference. The message manager 104 may generate a user interface message or information for a user interface message indicating the time difference and a modified time difference based on modifying one or more communication parameters. The user interface 114 may generate and/or display the user interface message, and receive a user command signal in response to the user interface message. The user interface 114 may forward to the response to the message manager 104, which then generates and sends the transmit control directive to the radio module 106 indicating to communicate the message over the wireless communication channel with a modified communication parameter based on the user command signal.

Operations for the above embodiments may be further described with reference to the following figures and accompanying examples. Some of the figures may include a logic flow and/or a logic diagram. Although such figures presented herein may include a particular logic flow and/or logic diagram, it can be appreciated that the logic flow and/or logic diagram merely provides an example of how the general functionality as described herein can be implemented. Further, the given logic flow and/or logic diagram does not necessarily have to be executed in the order presented, unless otherwise indicated. In addition, the given logic flow and/or logic diagram may be implemented by a hardware element (e.g., a logic device), a software element executed by a processor, or any combination thereof. The embodiments are not limited in this context.

Figure 3:
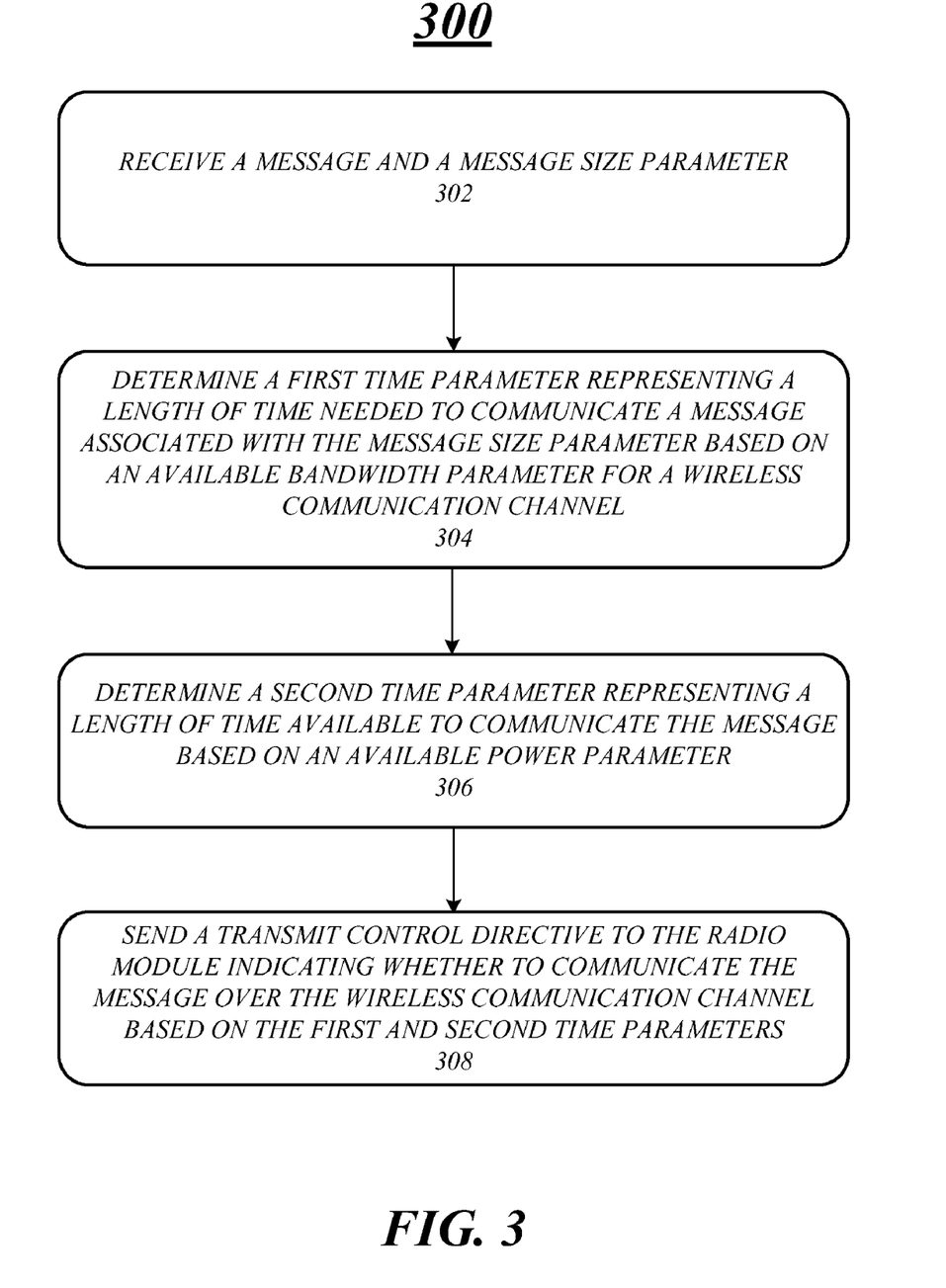
FIG. 3 illustrates one embodiment of a logic flow.

FIG. 3 illustrates a logic flow. In particular, FIG. 3 illustrates a logic flow 300, which may be representative of the operations executed by one or more embodiments described herein.

As shown in the FIG. 3, the logic flow 300 may receive a message size parameter for a message at block 302. For example, the message manager 104 may receive a message size parameter for a message generated by the messaging application 105. The messaging application 105 may comprise, for example, an email application with a file attachment, an SMS application with an attachment, a MMS application with an attachment, a voice mail application with an attachment, and any other messaging application. The embodiments are not limited in this context.

The logic flow 300 may determine a first time parameter representing a length of time needed to communicate the message based on an available bandwidth parameter for a wireless communication channel at block 304. For example, the message manager 104 may determine a first time parameter representing a length of time needed to communicate an email message and attachment based on an available bandwidth parameter for a wireless communication channel between the mobile computing device 110 and a wireless resource 130-1-n. The wireless communication channel may comprise, for example, a data communication channel. The first time parameter may vary as a function of message size and the available bandwidth parameter, which in turn may vary according to different RF conditions. The embodiments are not limited in this context.

The logic flow 300 may determine a second time parameter representing a length of time available to communicate the message based on an available power parameter at block 306. For example, the message manager 104 may determine a second time parameter representing a length of time available to communicate an email message and attachment based on an available power parameter received from the power manager 109. The second time parameter may vary as a function of message size and the available power parameter, which in turn may vary according to different RF conditions. The embodiments are not limited in this context.

The logic flow 300 may send a transmit control directive to the radio module indicating whether to communicate the message over the wireless communication channel based on the first and second time parameters at block 308. For example, the message manager 104 may send a transmit control directive to the radio module 106 indicating whether to communicate the message over the wireless communication channel based on a comparison of the first and second time parameters. The message manager 104 may automatically generate and send a transmit control directive, that is without user intervention, or the message manager 104 may solicit user commands to generate and send a transmit control directive. The embodiments are not limited in this context.

Figure 4:
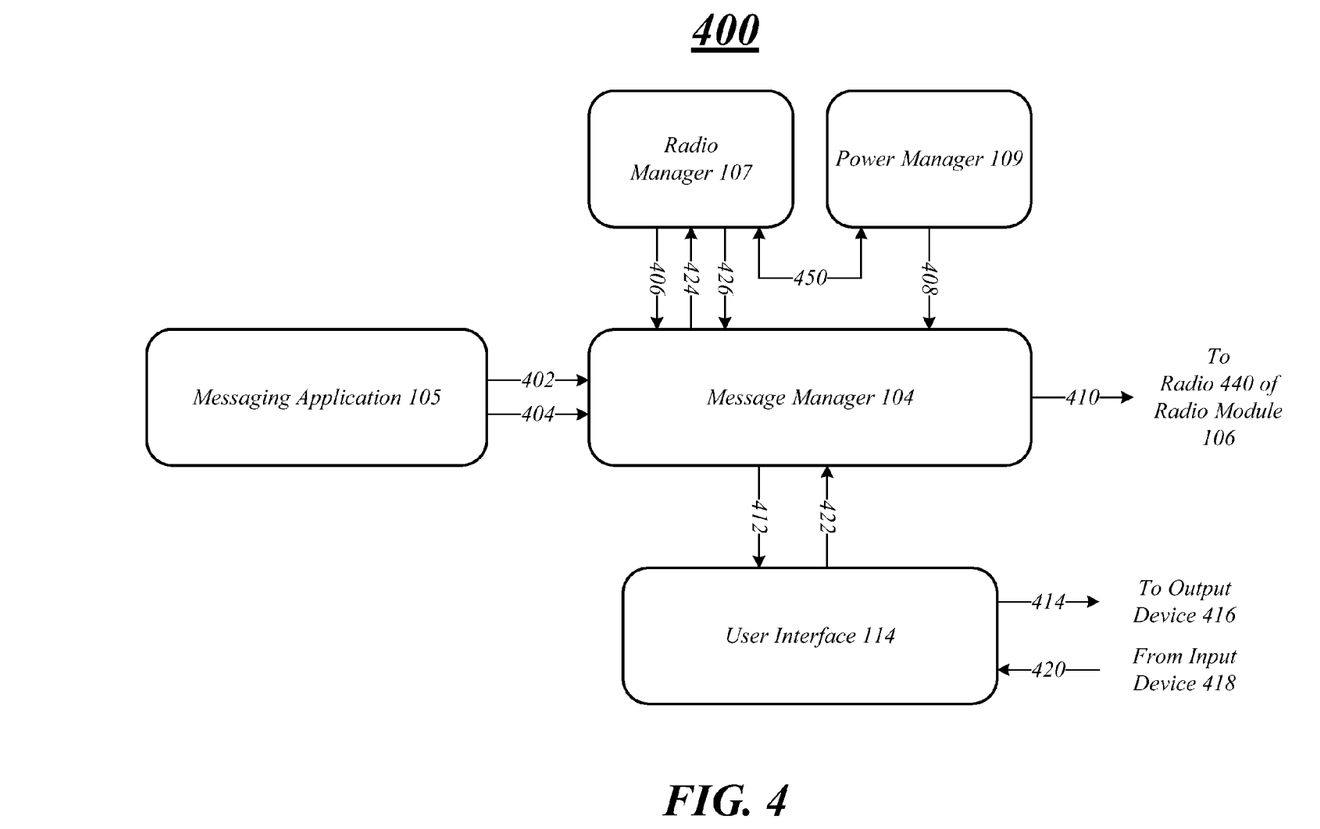
FIG. 4 illustrates one embodiment of a logic diagram.

FIG. 4 illustrates a logic diagram 400. The logic diagram 400 may illustrate one or more interfaces that may employ various techniques to exchange information between the elements of the mobile computing device 110, such as those shown and described with reference to the mobile computing device 110 of FIG. 1. For example, an interface may activate and/or detect activated signal lines. Such signal lines may be dedicated to particular signals. Alternatively, an interface may generate data messages to be transmitted across various connections. Exemplary connections may include a parallel interface, a serial interface, a bus interface, and/or a data network.

In the illustrated embodiment shown in FIG. 4, the messaging application 105 may generate a message 402 and a message size 404 and send one or both to the message manager 104. Additionally or alternatively, the messaging application 105 may send the message 402 to a conventional messaging interface and/or the radio module 106 used in a legacy device. The message manager 104 may also receive an available bandwidth parameter 406 and an available power parameter 408 from respective radio manager 107 and power manager 109. In one embodiment, the power manager 109 may generate the available power parameter 408 by exchanging RF information 450 with the radio manager 107 to factor in the affect of RF conditions on a discharge rate for the power supply of the power module 108. Additionally or alternatively, the message manager 104 may have logic to generate the message size 404, available bandwidth parameter 406, and available power parameter 408 itself using information provided by the respective messaging application 105, radio manager 107 and power manager 109. The message manager 104 may then generate first and second time parameters based on the message size 404, available bandwidth parameter 406, and available power parameter 408, compare the first and second time parameters, and generate a transmit control directive 410 for a radio 440 of the radio module 106 based on the comparison, a rule set and/or user commands.

In various embodiments, the message manager 104 may compare first and second time parameters to obtain a time difference, and send a transmit control directive 410 to the radio 440 of the radio module 106 based on the comparison. In one embodiment, for example, the message manager 104 may send a transmit control directive 410 indicating to delay communicating a message over a wireless communication channel when the time difference is less than a threshold value. In one embodiment, for example, the message manager 104 may send a transmit control directive 410 to the radio 440 of the radio module 106 indicating to communicate a message over the wireless communication channel when the time difference is greater than a threshold value.

In various embodiments, the message manager 104 may compare first and second time parameters to obtain a time difference, and send a transmit control directive 410 to the radio 440 of the radio module 106 based on the comparison and a user command. In one embodiment, the message manager 104 may generate a user interface message (or information for a user interface message) 412 indicating the time difference. For example, the user interface message 412 may include a text string such as "Sending this message will consume a out of b minutes remaining of battery time," with a and b variables comprising respective first and second time parameters. In another example, the user interface message 412 may include a text string such as "You will have c minutes remaining of battery time after sending this message," with c variable comprising a time difference. The precise text string may vary in accordance with a given implementation. The user interface 114 may receive the user interface message 412 from the message manager 104, and output a user interface message 414 to an output device 416, such as a touch screen display, for example. The user interface message 414 may include a text string and one or more options. A user may select an option using an input device 418, such as the touch screen display, which generates a user command signal 420. The user interface 114 may send the user command signal 420, or a variant 422, to the message manager 104. The message manager 104 may send a transmit control directive 410 with a modified communication parameter to the radio 440 of the radio module 106 based on the user command signal 420 and/or 422.

In various embodiments, the message manager 104 may attempt to modify a communication parameter for the radio 440 of the radio module 106 in order to shorten transmission time for a message and increase battery life for the mobile computing device 110. In one embodiment, this may be accomplished by soliciting information from the radio manager 107 by exchanging parameters 424, 426. The message manager 104 may compare the first and second time parameters to obtain a time difference, and realize there is insufficient time remaining to safely send a message. The message manager 104 may attempt to automatically modify a communication parameter for the radio 440 of the radio module 106 to increase the time difference, that is, increase remaining battery life. A particular communication parameter suitable for modification may be selected based on any number of rules, such as priority rules, QoS rules, reliability rules, protocol rules and so forth. For instance, switching modulation techniques may increase data rates at the cost of frame error rates, lowering a packet retry rate may increase data rates at the cost of reliability, and so forth. The message manager 104 may weigh the costs and benefits of modifying a given communication parameter based on a set of rules, and automatically decide to modify a communication parameter for the radio module to increase the time difference. The message manager 104 may generate and send a transmit control directive 410 to the radio 440 of the radio module 106 indicating to communicate the message over the wireless communication channel using a modified communication parameter.

In various embodiments, the message manager 104 may compare first and second time parameters to obtain a time difference, modify a communication parameter, and send a transmit control directive 410 to the radio 440 of the radio module 106 based on the comparison, modified communication parameter, and a user command. In one embodiment, the message manager 104 may generate a user interface message (or information for a user interface message) 412 indicating the time difference. For example, the user interface message 412 may include a text string such as "Sending this message will consume a out of b minutes remaining of battery time," with a and b variables comprising respective first and second time parameters. In another example, the user interface message 412 may include a text string such as "You will have c minutes remaining of battery time after sending this message," with c variable comprising a time difference. The precise text string may vary in accordance with a given implementation. In addition, the user interface message 414 may also include one or more options, including an option providing a modified time difference based on modifying one or more communication parameters. For example, the user interface message 414 may include a text string such as "If your image attachment is sent at a lower resolution you will have d minutes remaining of battery time after sending this message," with d variable comprising a modified time difference. The user interface 114 may receive the user interface message 412 from the message manager 104, and output a user interface message 414 to an output device 416, such as a touch screen display, for example. The user interface message 414 may include a text string and one or more options. A user may select an option using an input device 418, such as the touch screen display, which generates a user command signal 420. The user interface 114 may send the user command signal 420, or a variant 422, to the message manager 104. The message manager 104 may send a transmit control directive 410 with a modified communication parameter to the radio 440 of the radio module 106 based on the user command signal 420 and/or 422.

Figure 5:
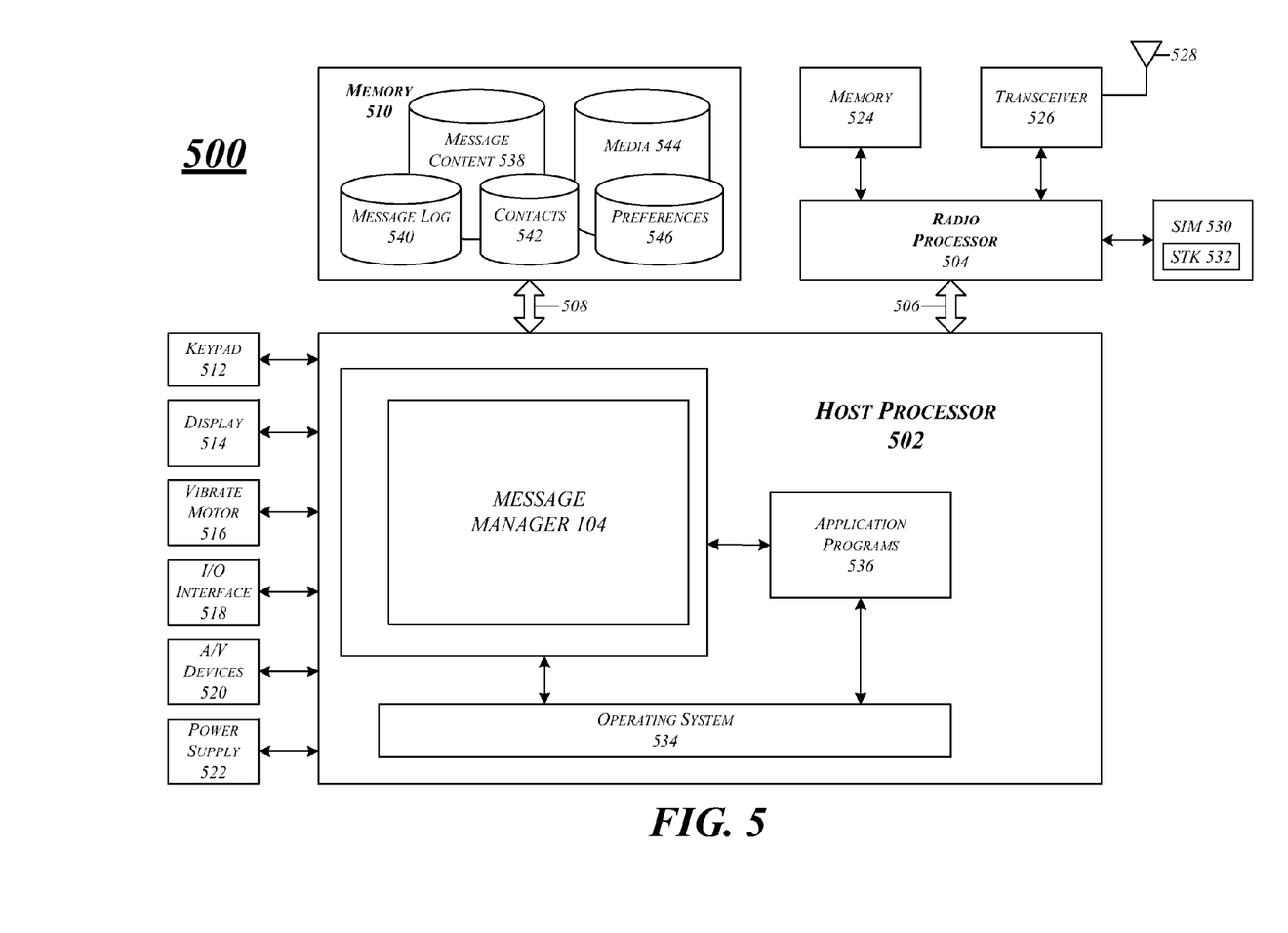
FIG. 5 illustrates one embodiment of a second mobile computing device.

FIG. 5 illustrates a block diagram of a second mobile computing device 500 suitable for implementing various embodiments, including the mobile computing device 110. It may be appreciated that the mobile computing device 500 is only one example of a suitable mobile computing environment and is not intended to suggest any limitation as to the scope of use or functionality of the embodiments. Neither should the mobile computing device 500 be interpreted as having any dependency or requirement relating to any one or combination of components illustrated in the exemplary mobile computing device 500.

The host processor 502 (e.g., similar to the processor 102) may be responsible for executing various software programs such as system programs and applications programs to provide computing and processing operations for the mobile computing device 500. The radio processor 504 may be responsible for performing various voice and data communications operations for the mobile computing device 500 such as transmitting and receiving voice and data information over one or more wireless communications channels. Although the mobile computing device 500 is shown with a dual-processor architecture, it may be appreciated that the mobile computing device 500 may use any suitable processor architecture and/or any suitable number of processors or number of processor cores in accordance with the described embodiments. In one embodiment, for example, the processors 502, 504 may be implemented using a single integrated processor.

The host processor 502 may be implemented as a host central processing unit (CPU) using any suitable processor or logic device, such as a as a general purpose processor. The host processor 502 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 502 may be coupled through a memory bus 508 to a memory 510. The memory bus 508 may comprise any suitable interface and/or bus architecture for allowing the host processor 502 to access the memory 510. Although the memory 510 may be shown as being separate from the host processor 502 for purposes of illustration, it is worthy to note that in various embodiments some portion or the entire memory 510 may be included on the same integrated circuit as the host processor 502. Alternatively, some portion or the entire memory 510 may be disposed on an integrated circuit or other medium (e.g., hard disk drive) external to the integrated circuit of the host processor 502. In various embodiments, the mobile computing device 500 may comprise an expansion slot to support a multimedia and/or memory card, for example.

The memory 510 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 500 may comprise an alphanumeric keypad 512 coupled to the host processor 502. The keypad 512 may comprise, for example, a QWERTY key layout and an integrated number dial pad. The mobile computing device 500 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 512 may comprise a physical keypad using hard buttons, or a virtual keypad using soft buttons displayed on a display 514. The keypad may also comprise a thumbboard.

The mobile computing device 500 may comprise a display 514 coupled to the host processor 502. The display 514 may comprise any suitable visual interface for displaying content to a user of the mobile computing device 500. In one embodiment, for example, the display 514 may be implemented by a liquid crystal display (LCD) such as a touch-sensitive or touch screen color (e.g., 56-bit color) thin-film transistor (TFT) LCD screen. The touch-sensitive or touch screen LCD may be used with a stylus and/or a handwriting recognizer program.

The mobile computing device 500 may comprise a vibrating motor 516 coupled to the host processor 502. The vibrating motor 516 may be enable or disabled according to the preferences of the user of the mobile computing device 500. When enabled, the vibrating motor 516 may cause the mobile computing device 500 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 500 may comprise an input/output (I/O) interface 518 coupled to the host processor 502. The I/O interface 518 may comprise one or more I/O devices such as a serial connection port, SDIO bus, PCI, USB, an infrared port, integrated Bluetooth wireless capability, global position system (GPS) capability, and/or integrated 802.11x (e.g. 802.11b, 802.11g, 802.11a, 802.11n, etc.) (WiFi) wireless capability, to enable wired (e.g., USB cable) and/or wireless connection to a local computer system, such as a local personal computer (PC). In various implementations, mobile computing device 500 may be arranged to synchronize information with a local computer system.

The host processor 502 may be coupled to various audio/video (A/V) devices 520 that support A/V capability of the mobile computing device 500. Examples of A/V devices 520 may include, for example, a microphone, one or more speakers (such as speaker system 108), an audio port to connect an audio headset, an audio coder/decoder (codec), an audio player, a Musical Instrument Digital Interface (MIDI) device, a digital camera, a video camera, a video codec, a video player, and so forth.

The host processor 502 may be coupled to a power supply 522 arranged to supply and manage power to the elements of the mobile computing device 500. In various embodiments, the power supply 522 may be implemented by a rechargeable battery, such as a removable and rechargeable lithium ion battery to provide direct current (DC) power, and/or an alternating current (AC) adapter to draw power from a standard AC main power supply. The power supply 522 may be representative of a power supply for the power module 108 described with reference to FIG. 1, for example.

The radio processor 504 may be arranged to communicate voice information and/or data information over one or more assigned frequency bands of a wireless communication channel. The radio processor 504 may be implemented as a communications processor using any suitable processor or logic device, such as a modem processor or baseband processor. The radio processor 504 may also be implemented as a digital signal processor (DSP), media access control (MAC) processor, or any other type of communications processor in accordance with the described embodiments. The radio processor 504 may perform analog and/or digital baseband operations for the mobile computing device 500. For example, the radio processor 504 may perform digital-to-analog conversion (DAC), analog-to-digital conversion (ADC), modulation, demodulation, encoding, decoding, encryption, decryption, and so forth. The radio processor 504 may be representative of a radio processor for the radio module 106 described with reference to FIG. 1, for example.

The mobile computing device 500 may comprise a memory 524 coupled to the radio processor 504. The memory 524 may be implemented using any of the computer-readable media described with reference to the memory 510. The memory 524 may be typically implemented as flash memory and synchronous dynamic random access memory (SDRAM). Although the memory 524 may be shown as being separate from the radio processor 504, some or all of the memory 524 may be included on the same IC as the radio processor 504.

The mobile computing device 500 may comprise a transceiver module 526 coupled to the radio processor 504. The transceiver module 526 may comprise one or more transceivers or radios, such as wireless transceivers 108 of mobile computing device 100, arranged to communicate using different types of protocols, communication ranges, operating power requirements, RF sub-bands, information types (e.g., voice or data), use scenarios, applications, and so forth. In various embodiments, the transceiver module 526 may comprise one or more transceivers arranged to support voice communications and/or data communications for the wireless network systems or protocols as previously described. In some embodiments, the transceiver module 526 may further comprise a Global Positioning System (GPS) transceiver to support position determination and/or location-based services.

The transceiver module 526 generally may be implemented using one or more chips as desired for a given implementation. Although the transceiver module 526 may be shown as being separate from and external to the radio processor 504 for purposes of illustration, it is worthy to note that in various embodiments some portion or the entire transceiver module 526 may be included on the same integrated circuit as the radio processor 504. The embodiments are not limited in this context.

The mobile computing device 500 may comprise an antenna system 528 for transmitting and/or receiving electrical signals. As shown, the antenna system 528 may be coupled to the radio processor 504 through the transceiver module 526. The antenna system 528 may comprise or be implemented as one or more internal antennas and/or external antennas, such as antenna 112 of mobile computing device 100.

The mobile computing device 500 may comprise a subscriber identity module (SIM) 530 coupled to the radio processor 504. The SIM 530 may comprise, for example, a removable or non-removable smart card arranged to encrypt voice and data transmissions and to store user-specific data for allowing a voice or data communications network to identify and authenticate the user. The SIM 530 also may store data such as personal settings specific to the user. In some embodiments, the SIM 530 may be implemented as an UMTS universal SIM (USIM) card or a CDMA removable user identity module (RUIM) card. The SIM 530 may comprise a SIM application toolkit (STK) 532 comprising a set of programmed commands for enabling the SIM 530 to perform various functions. In some cases, the STK 532 may be arranged to enable the SIM 530 to independently control various aspects of the mobile computing device 500.

As mentioned above, the host processor 502 may be arranged to provide processing or computing resources to the mobile computing device 500. For example, the host processor 502 may be responsible for executing various software programs including system programs such as operating system (OS) 534 and application programs 536. System programs generally may assist in the running of the mobile computing device 500 and may be directly responsible for controlling, integrating, and managing the individual hardware components of the computer system. The OS 534 may be implemented, for example, as a Palm WebOS®, Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 500 may comprise other system programs such as device drivers, programming tools, utility programs, software libraries, application programming interfaces (APIs), and so forth.

Application programs 536 generally may allow a user to accomplish one or more specific tasks. In various implementations, the application programs 536 may provide one or more graphical user interfaces (GUIs) to communicate information between the mobile computing device 500 and a user. In some embodiments, application programs 536 may comprise upper layer programs running on top of the OS 535 of the host processor 502 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 536 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an email application, an SMS application, an MMS application, and so forth. It is also to be appreciated that the mobile computing device 500 may implement other types of applications in accordance with the described embodiments.

The host processor 502 may include the message manager 104 and the messaging application 105 in some embodiments, as described with reference to FIG. 1, for example.

The mobile computing device 500 may include various databases implemented in the memory 510. For example, the mobile computing device 500 may include a message content database 538, a message log database 540, a contacts database 542, a media database 544, a preferences database 546, and so forth. The message content database 538 may be arranged to store content and attachments (e.g., media objects) for various types of messages sent and received by one or more messaging applications. The message log 540 may be arranged to track various types of messages which are sent and received by one or more messaging applications. The contacts database 542 may be arranged to store contact records for individuals or entities specified by the user of the mobile computing device 500. The media database 544 may be arranged to store various types of media content such as image information, audio information, video information, and/or other data. The preferences database 546 may be arranged to store various settings such as rules and parameters for controlling the operation of the mobile computing device 500.

In some cases, various embodiments may be implemented as an article of manufacture. The article of manufacture may include a computer readable storage medium arranged to store logic, instructions and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A mobile computing device, comprising:
   a radio module to establish a wireless communication channel with a wireless resource,
   the radio module comprising a radio manager to measure available bandwidth for the wireless communication channel based on one or more communication parameters, and
   generate an available bandwidth parameter based on the measurements; and
   a message manager communicatively coupled with the radio module, the message manager to:
   receive a message size parameter for a message,
   determine a first time parameter representing a length of time needed to communicate the message based on the available bandwidth parameter,
   determine a second time parameter representing a length of time available to communicate the message based on an available power parameter,
   send a transmit control directive to the radio module indicating whether to communicate the message over the wireless communication channel based on the first and second time parameters,
   compare the first and second time parameters to obtain a time difference, and
   send a transmit control directive to the radio module indicating to delay communicating the message over the wireless communication channel when the time difference is less than a threshold value.

2. The mobile computing device of claim 1, comprising a power manager communicatively coupled with a power supply and the message manager, the power manager to generate the available power parameter.

3. The mobile computing device of claim 1, comprising a messaging application to generate the message and the message size parameter.

4. The mobile computing device of claim 1, the message manager to send the transmit control directive to the radio module indicating to communicate the message over the wireless communication channel when the time difference is greater than the threshold value.

5. The mobile computing device of claim 1, the message manager to:
   generate a user interface message indicating the time difference,
   receive a user command signal in response to the user interface message, and
   send the transmit control directive to the radio module indicating whether to communicate the message over the wireless communication channel based on the user command signal.

6. The mobile computing device of claim 1, the message manager to:
   modify a communication parameter for the radio module to increase the time difference, and
   send the transmit control directive to the radio module indicating to communicate the message over the wireless communication channel using a modified communication parameter.

7. The mobile computing device of claim 1, the message manager to:

generate a user interface message indicating the time difference and a modified time difference based on modifying one or more communication parameters,
receive a user command signal in response to the user interface message, and
send the transmit control directive to the radio module indicating to communicate the message over the wireless communication channel with a modified communication parameter based on the user command signal.

8. The mobile computing device of claim 1, comprising a thumb board, an omni-directional antenna and a touch screen display.

9. A method, comprising:
measuring available bandwidth for a wireless communication channel based on one or more communication parameters;
generating an available bandwidth parameter based on the measurements;
receiving a message size parameter for a message;
determining a first time parameter representing a length of time needed to communicate the message based on the available bandwidth parameter for the wireless communication channel;
determining a second time parameter representing a length of time available to communicate the message based on an available power parameter;
sending a transmit control directive to the radio module indicating whether to communicate the message over the wireless communication channel based on the first and second time parameters;
comparing the first and second time parameters to obtain a time difference; and
sending the transmit control directive to the radio module indicating to delay communicating the message over the wireless communication channel when the time difference is less than a threshold value.

10. The method of claim 9, comprising
sending the transmit control directive to the radio module indicating to communicate the message over the wireless communication channel when the time difference is greater than the threshold value.

11. The method of claim 9, comprising:
generating a user interface message indicating the time difference;
receiving a user command signal in response to the user interface message; and
sending the transmit control directive to the radio module indicating whether to communicate the message over the wireless communication channel based on the user command signal.

12. The method of claim 9, comprising:
modifying a communication parameter for the radio module to increase the time difference; and
sending the transmit control directive to the radio module indicating to communicate the message over the wireless communication channel using a modified communication parameter.

13. The method of claim 9, comprising:
generating a user interface message indicating the time difference and a modified time difference based on modifying one or more communication parameters;
receiving a user command signal in response to the user interface message; and
sending the transmit control directive to the radio module indicating to communicate the message over the wireless communication channel with a modified communication parameter based on the user command signal.

14. An article of manufacture comprising a computer-readable storage medium containing instructions that when executed by a processor enable a system to:
measure available bandwidth for a wireless communication channel based on one or more communication parameters;
generate an available bandwidth parameter based on the measurements;
receive a message size parameter for a message;
determine a first time parameter representing a length of time needed to communicate the message based on the available bandwidth parameter for the wireless communication channel;
determine a second time parameter representing a length of time available to communicate the message based on an available power parameter;
send a transmit control directive to the radio module indicating whether to communicate the message over the wireless communication channel based on the first and second time parameters;
compare the first and second time parameters to obtain a time difference; and
send the transmit control directive to the radio module indicating to delay communicating the message over the wireless communication channel when the time difference is less than a threshold value.

15. The article of manufacture of claim 14, further comprising instructions that when executed by the processor enable the system to
send the transmit control directive to the radio module indicating to communicate the message over the wireless communication channel when the time difference is greater than a threshold value.

16. The article of manufacture of claim 14, further comprising instructions that when executed by the processor enable the system to:
generate a user interface message indicating the time difference;
receive a user command signal in response to the user interface message; and
send the transmit control directive to the radio module indicating whether to communicate the message over the wireless communication channel based on the user command signal.

17. The article of manufacture of claim 14, further comprising instructions that when executed by the processor enable the system to:
generate a user interface message indicating the time difference and a modified time difference based on modifying one or more communication parameters;
receive a user command signal in response to the user interface message; and
send the transmit control directive to the radio module indicating to communicate the message over the wireless communication channel with a modified communication parameter based on the user command signal.

* * * * *